(12) United States Patent
Dahlhoff et al.

(10) Patent No.: US 11,841,226 B2
(45) Date of Patent: Dec. 12, 2023

(54) INERTIAL MEASURING DEVICE FOR DETERMINING A NORTH DIRECTION

(71) Applicant: Northrop Grumman Litef GmbH, Freiburg (DE)

(72) Inventors: Andrea Dahlhoff, Emmendingen (DE); Claus Kühne, Freiburg (DE); Christian Spannagel, Freiburg (DE)

(73) Assignee: NORTHROP GRUMMAN LITEF GMBH, Freiburg (DE)

( * ) Notice: Subject to any disclaimer, the term of this patent is extended or adjusted under 35 U.S.C. 154(b) by 600 days.

(21) Appl. No.: 16/612,377

(22) PCT Filed: Apr. 27, 2018

(86) PCT No.: PCT/EP2018/060966
§ 371 (c)(1),
(2) Date: Nov. 9, 2019

(87) PCT Pub. No.: WO2018/206330
PCT Pub. Date: Nov. 15, 2018

(65) Prior Publication Data
US 2020/0096335 A1 Mar. 26, 2020

(30) Foreign Application Priority Data
May 11, 2017 (DE) .................. 10 2017 110 205.1

(51) Int. Cl.
*G01C 19/38* (2006.01)
*G01P 15/18* (2013.01)
*H01M 10/46* (2006.01)

(52) U.S. Cl.
CPC .............. *G01C 19/38* (2013.01); *G01P 15/18* (2013.01); *H01M 10/46* (2013.01)

(58) Field of Classification Search
CPC ......... G01P 15/18; G01P 15/08; G01C 19/38; G01C 21/165
See application file for complete search history.

(56) References Cited

U.S. PATENT DOCUMENTS

| 6,010,626 A | 1/2000 | Adriano |
| 2012/0289905 A1 | 11/2012 | Julian et al. |
| 2016/0010989 A1* | 1/2016 | Booij ................... H04N 7/181 |
| | | 348/135 |
| 2016/0017670 A1* | 1/2016 | Ayris .................... E21B 47/024 |
| | | 175/40 |

(Continued)

FOREIGN PATENT DOCUMENTS

| CN | 1865637 A | 11/2006 |
| CN | 102823960 A | 12/2012 |

(Continued)

OTHER PUBLICATIONS

English Translation of CN203879491.*

(Continued)

*Primary Examiner* — Helen C Kwok
(74) *Attorney, Agent, or Firm* — TAROLLI, SUNDHEIM, COVELL & TUMMINO LLP

(57) ABSTRACT

The invention relates to an inertial measuring device, having an inertial measuring unit for determining a north direction and for determining position angles, having a battery, and having a wireless interface, which inertial measuring device has a housing, in which the inertial measuring unit, the battery and the interface are housed. A carrying handle is provided on the housing, which carrying handle is designed as a one-hand carrying handle such that the inertial measuring device can be carried with only one hand during normal use.

11 Claims, 4 Drawing Sheets

(56) References Cited

U.S. PATENT DOCUMENTS

| | | | | |
|---|---|---|---|---|
| 2016/0033643 A1* | 2/2016 | Zweigle | ................ | G05D 1/024 |
| | | | | 356/5.01 |
| 2016/0341543 A1* | 11/2016 | Jancic | ...................... | G01C 3/08 |
| 2018/0058536 A1* | 3/2018 | Pathak | .................... | G05B 5/01 |
| 2018/0292541 A1* | 10/2018 | De Silva | ................ | G01S 17/10 |

FOREIGN PATENT DOCUMENTS

| | | | |
|---|---|---|---|
| CN | 103733497 | | 4/2014 |
| CN | 203879491 | * | 10/2014 |
| CN | 203879491 U | | 10/2014 |
| CN | 104661938 | | 5/2015 |
| CN | 105531331 A | | 4/2016 |
| CN | 106123880 A | | 11/2016 |
| DE | 102014109592 A1 | | 1/2015 |
| EP | 2354752 A1 | | 8/2011 |
| KR | 20010063215 A | | 7/2001 |
| WO | 2013123555 A1 | | 8/2013 |
| WO | 2017024128 A1 | | 2/2017 |

OTHER PUBLICATIONS

Canadian Office Action for Application No. 3062110 dated Jan. 12, 2021.
Office Action for corresponding Chinese application 201880030328.4 dated Nov. 2, 2022.
Search Report of the corresponding CN patent application No. 201880030328.4., dated May 5, 2023.

\* cited by examiner

INERTIAL MEASURING DEVICE FOR DETERMINING A NORTH DIRECTION

RELATED APPLICATIONS

The present invention is a U.S. National Stage under 35 USC 371 patent application, claiming priority to Serial No. PCT/EP2018/060966, filed on 27 Apr. 2018; which claims priority of DE 10 2017 110 205.1, filed on 11 May 2017, the entirety of both of which are incorporated herein by reference.

The invention relates to an inertial measuring device.

Inertial measuring devices are known. An inertial measuring device is, for example, described in AU 2012 101 210 C4, which can be mounted on the drill rod of a soil drilling device, in order to be able to determine the orientation of the drill before the actual drilling operation. The orientation of the drill can be precisely performed with the aid of the inertial measuring device. Thereafter, the measuring device is removed, and the drilling operation commenced.

Inertial measuring devices, if designed as independent portable measuring devices at all, are difficult to handle and thus impractical.

The invention is based on the object to provide an inertial measuring device where the handling is improved compared to the prior art.

The problem is solved by an inertial measuring device having the features as disclosed herein.

An inertial measuring device includes an inertial measuring unit for determining a north direction and for determining position angles, a battery, a wireless interface and a housing, within which the inertial measuring device [sic!], the battery and the interface are housed. A carrying handle is provided on the housing, which is formed as a one-hand carrying handle for carrying the inertial measuring device with one hand only during its intended use.

An inertial measuring unit (inertial measurement unit) is known, per se. An inertial measurement unit (IMU) is a spatial combination of a plurality of inertial sensors such as acceleration sensors and rotation rate sensors. To detect the six possible kinematic degrees of freedom, an IMU has three acceleration sensors (translation sensors) each standing orthogonally above one another to detect the translational movement in x or y or z axis, and three rotation rate sensors (gyroscopic sensors) mounted orthogonally to one another to detect rotating (circular) movements in x or y or z axis. An inertial measuring unit provides three linear acceleration values for the translational movement and three angular velocities for the rotation rates as measured values. In an inertial navigation system (INS), the linear velocity is determined through integration and the position in space relating to a reference point through integration again from the measured values of the IMU for linear accelerations, following compensation of gravity. The integration of the three angular velocities provides, in relation to a reference point, the orientation in space.

The battery serves as an energy storage and supplies the measuring unit and the wireless interface with electrical energy. All components of the measuring device are housed within the housing in a protected manner. With the aid of the one-hand carrying handle, the compact housing together with the components housed therein can be easily carried with one hand only, similarly to a suitcase. Thus, the measuring device is very mobile and easy to handle.

The inertial measuring unit can have a north-seeking means, comprising three gyroscopes and three acceleration sensors. This can, for example, be an IMU (inertial measurement unit) with three fiber-optic gyroscopes arranged as a triad, as well as with three acceleration sensors. The acceleration sensors can be designed as MEMS acceleration sensors (micro-electro-mechanical systems).

The inertial measuring device can, in particular, be designed to measure pitch and roll position angles.

The battery can be designed as a rechargeable battery.

The battery can be changeably inserted into the housing. This enables easy exchange of the battery with a spare battery. In this process, it can be reasonable to fix the battery with the aid of a locking means within the device or within the housing, in order to ensure, in all operating positions, that the battery cannot fall from the housing and from the battery holder within the housing intended therefor.

The exchange possibility of the battery is advantageous to insert batteries with a relatively low capacity. Thus, a battery with a large capacity need not be provided in the measuring device, which would result in corresponding weight. Rather, any number of spare batteries can be provided, in order to also change the battery in relatively short cycles if required, so that continuous operation of the measuring device can be achieved.

The wireless interface can be a Bluetooth interface, for example, in the form of an interface card housed within the housing. The wireless interface enables to enable information with means, for example, output, display or input means, provided outside the measuring device per radio. This will eliminate an otherwise required cable for data transmission.

At least a portion of the housing and a portion of the carrying handle can be integrally formed with each other. In this process, the housing and the carrying handle can substantially be made completely from plastic. Depending on the design of the housing, it can be convenient to divide the housing into several parts, for example, two housing shells. Similarly, it can be convenient to seal the housing, in order to protect the components housed therein and also protect it from unauthorized interference.

The housing can extend in a longitudinal direction, with the carrying handle then being able extend in the longitudinal direction of the housing, as well. In this way, the housing can be controlled well via the carrying handle and thus safely carried.

The housing can have a horizontally extending fastening plate on its underside to fasten the measuring device on an object, e.g. on the measuring object. The fastening plate can thus define a horizontal fastening plane. It can be designed in a highly precise manner in order to realize fastening on the object with high precision. Optionally, adapter plates specifically designed for this purpose can be fastened on the fastening plate, with the aid of which the measuring device can be fastened on the object provided for this purpose.

The object can, in particular, be the object to be measured, i.e. the object of which the position is to be determined.

The carrying handle can have a first handle area extending substantially parallel to the fastening plate.

In addition, the carrying handle can have a second handle area adjacent to the first handle area, extending to the fastening plate at an angle of more than 30°, in particular, more than 45°, in particular more than 60°. The measuring device can thus be held with one hand both optionally on the first handle area or on the second handle area. Whereas the first handle area facilitates putting the fastening plate onto the object to be measured, the measuring device can, for example, be put in a vertical position when seizing the second handle area. For this purpose, corresponding support feet can be formed on the housing opposite of the second handle area on the outside of an opposite front side of the housing.

The first handle area can transition into the second handle area and can, in this process, bend. The second handle area thus has a corresponding angle to the first handle area.

A fastening means for fastening a carrying strap can be provided on the housing, in particular, on the carrying handle. The fastening means can, for example, have two eyelets, which are formed on the housing or, in particular, on the carrying handle, and to which the carrying strap can be fastened. Thus, it is possible to carry the measuring device by the carrying strap, for example, on the shoulder, and hence have the hands free for other activities.

In addition, a system is provided, comprising an inertial measuring device as, for example, described above, a mobile data terminal, a computer program able to run on the mobile data terminal, with data exchange being possible between the inertial measuring device and the data terminal via the interface. The data terminal can, for example, be a smartphone, a tablet or a laptop. In the case of a smartphone or a tablet, the computer program can be realized as a so-called app.

The data terminal can have a display means for displaying the measurement results measured by the inertial measuring device and transmitted via the interface.

The data terminal can have an input means for inputting control commands for controlling the inertial measuring device.

Hence, if the data terminal is a smartphone or tablet and thus enables both display and input via the display screen and the touch-sensitive screen, the measuring device can be completely operated via the smartphone with the aid of the smartphone or a corresponding tablet. For this reason, it is not required to provide displays or operating and/or control elements on the actual inertial measuring device. It can be convenient only to provide an on/off switch on the inertial measuring device.

The inertial measuring device is, for example, suited to orientate drill heads or drill rods for, e.g., soil drilling devices, and can for this purpose be correspondingly fastened on a drill rod. Another area of application can be the monitoring of building structures such as high buildings, dam walls, load-bearing walls, etc. Similarly, the inertial measuring device can be used to monitor the structure of a wind turbine. Track measurement can be another area of application, where the inertial measuring device is mounted on a trolley which is movable on the track to be measured.

These and additional advantages and features of the invention are explained in more detail in the following text, based on an example with the aid of the accompanying figures, in which.

Figure 1:
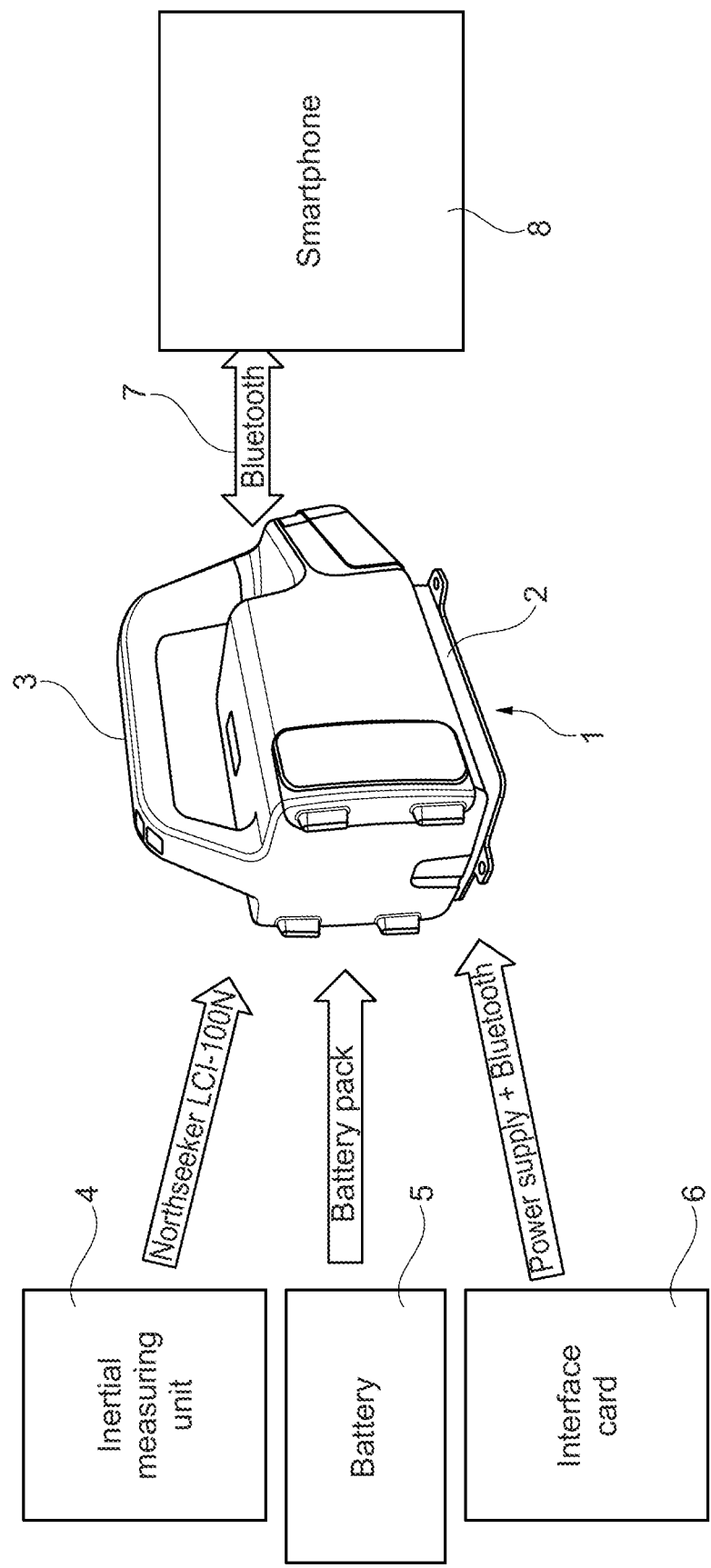
FIG. 1 shows a diagram with an overview of a measuring system comprising an inertial measuring device.
Figure 2:
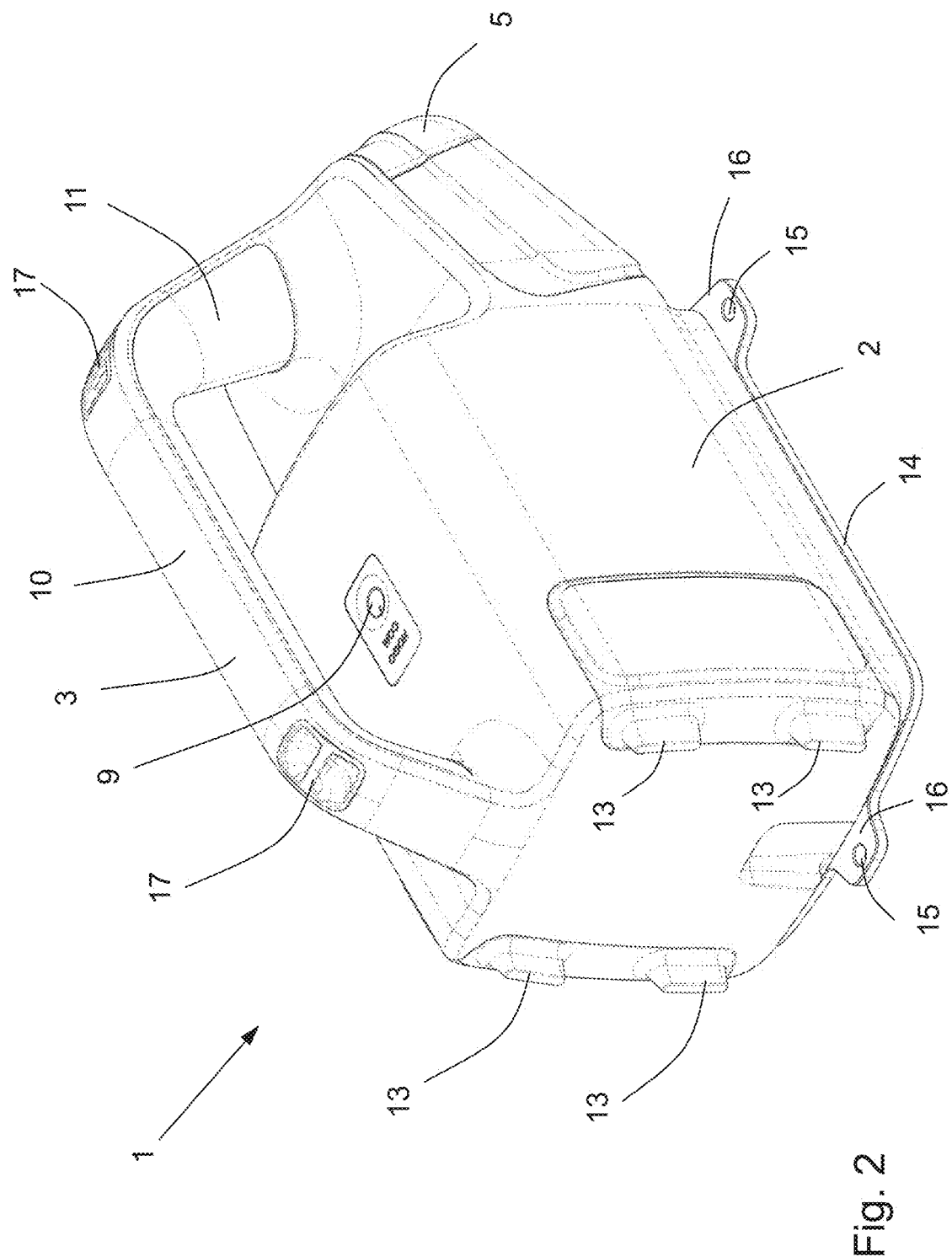
FIG. 2 shows the inertial measuring device of FIG. 1 in the perspective view.
Figure 3:
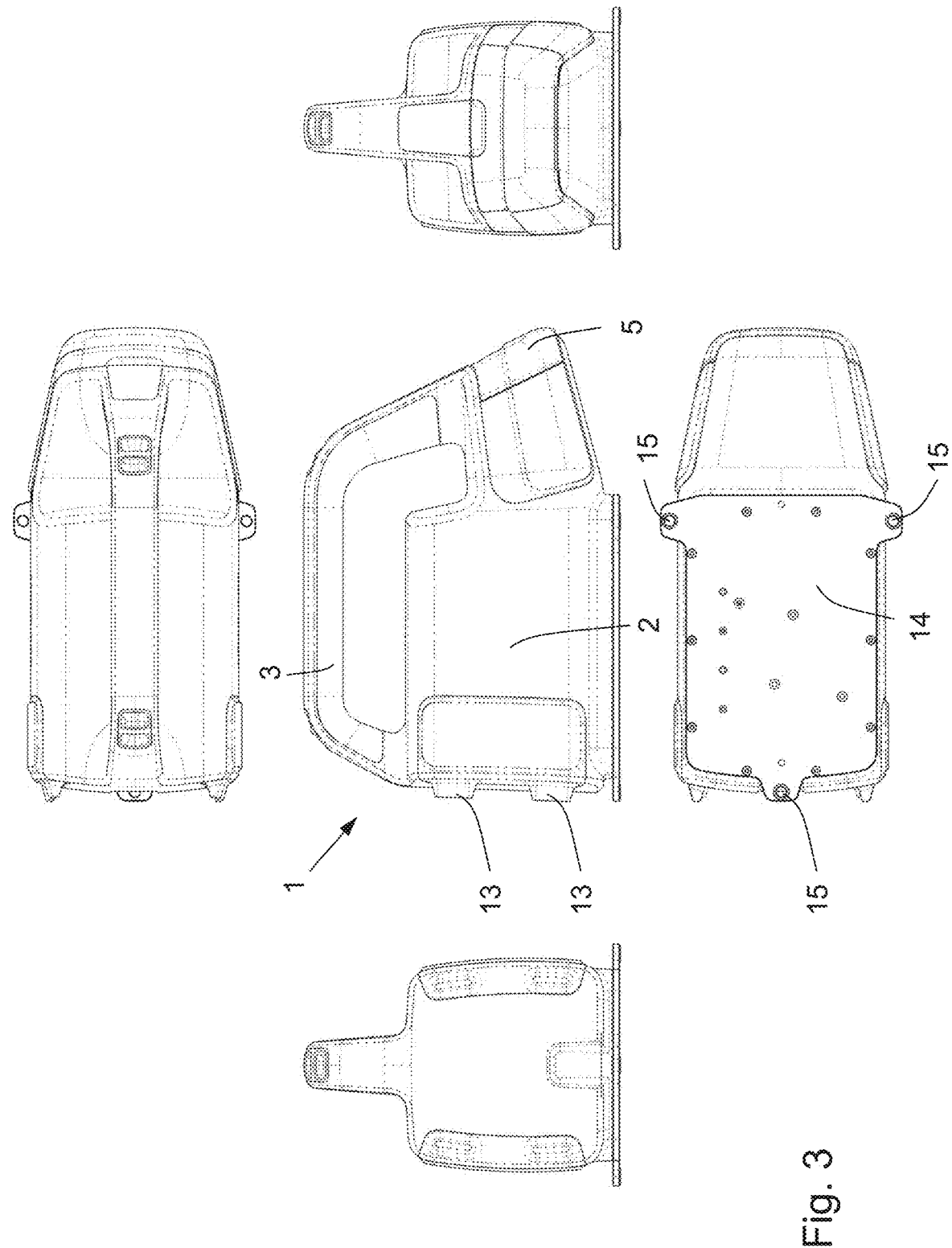
FIG. 3 shows the inertial measuring device in various side views.

An inertial measuring device 1 is shown in FIGS. 1 to 5.

The inertial measuring device 1 has a housing 2 on which a carrying handle 3 is formed.

Inside the housing 2, an inertial measuring unit 4 serving as a north seeker, a rechargeable battery 5, and an interface card 6 for providing a wireless Bluetooth interface 7 are housed.

Via the Bluetooth interface 7, it is possible that the inertial measuring device 1 communicates with a smartphone 8 serving as a data terminal. On the smartphone 8, a so-called "app" can be installed, with the aid of which data, in particular, measurement, state or other operational data, from the inertial measuring device 1, which are transmitted to the smartphone 8 via the Bluetooth interface 7, can be displayed. Similarly, it is possible to enter control commands via the smartphone 8, which are then transmitted to the inertial measuring device 1 via the Bluetooth interface 7.

The battery 5 can be designed as a battery pack, which can be inserted into the housing 2 on its front side. In this way, an empty battery can be easily removed from the housing 2 and replaced with a newly charged battery 5. In this process, the rest of the housing 2 remains closed, so that the sensitive components, in particular, the inertial measuring unit 4 and the interface card 6, are well protected from outside influences.

In particular, a corresponding battery holder can be provided within the housing 2, into which the battery 5 can be inserted in a reliable and safe manner. The battery holder can be separated from the rest of the components inside the housing 2, in particular, the inertial measuring unit 4 and the interface card 6, to prevent damage to these components when handling the battery 5. In addition, the battery holder can be sealed against the inside of the housing 2, in order to prevent penetration of moisture.

A power switch 9 is provided on the housing 2, via which the inertial measuring device 1 can be switched on and off.

The carrying handle 3 is integrally connected to the rest of the housing 2. Thus, the housing 2 and the carrying handle 3 can be conveniently produced as an integrative plastic component. Hence, the housing 2 can transition integrally into the carrying handle 3. Thus, in this embodiment, the carrying handle 3 need not be fastened on the housing 2 as an independent structural element.

The carrying handle 3 is divided into two handle areas: a first handle area 10 extends substantially horizontally. A second handle area 11 bends from the first handle area 10 at an angle. An operator can thus seize the carrying handle 3 at both handle areas 10, 11 in a comfortable manner.

Figure 4:
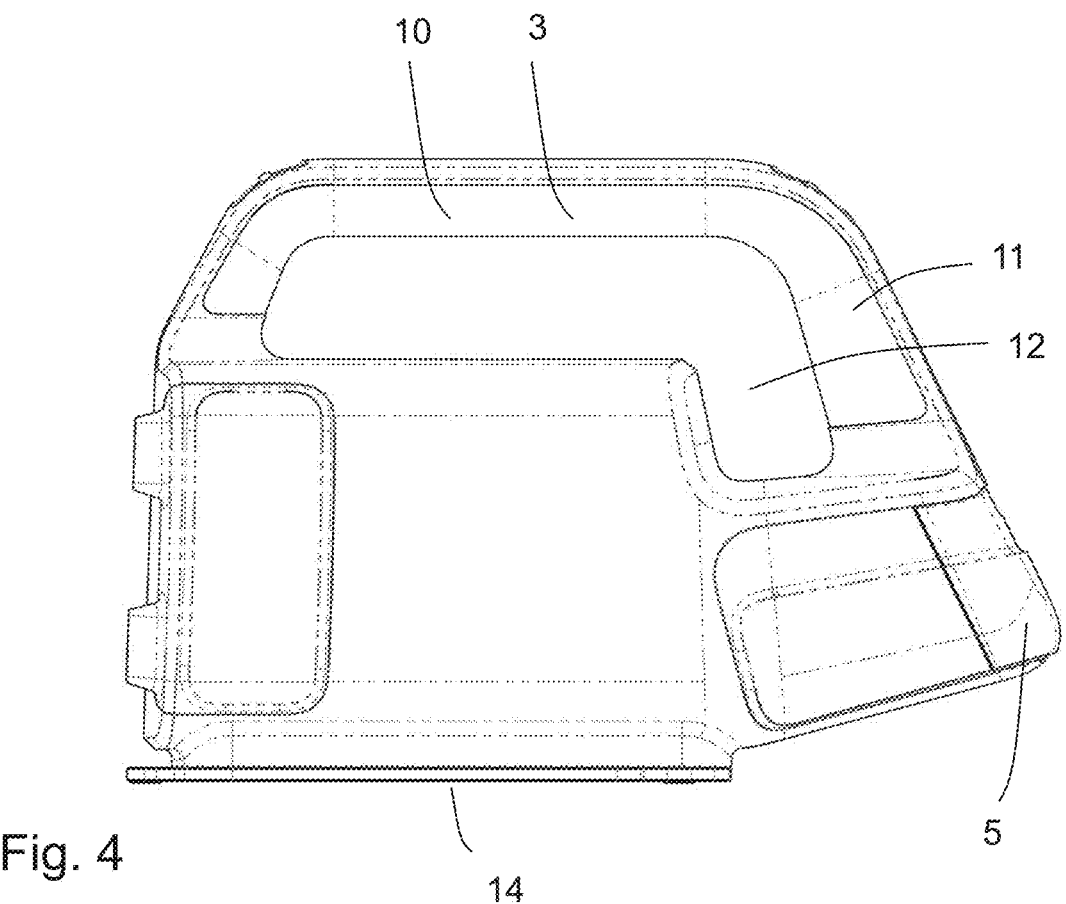
FIG. 4 shows an enlarged side view of the inertial measuring device of FIG. 3.
Figure 5:
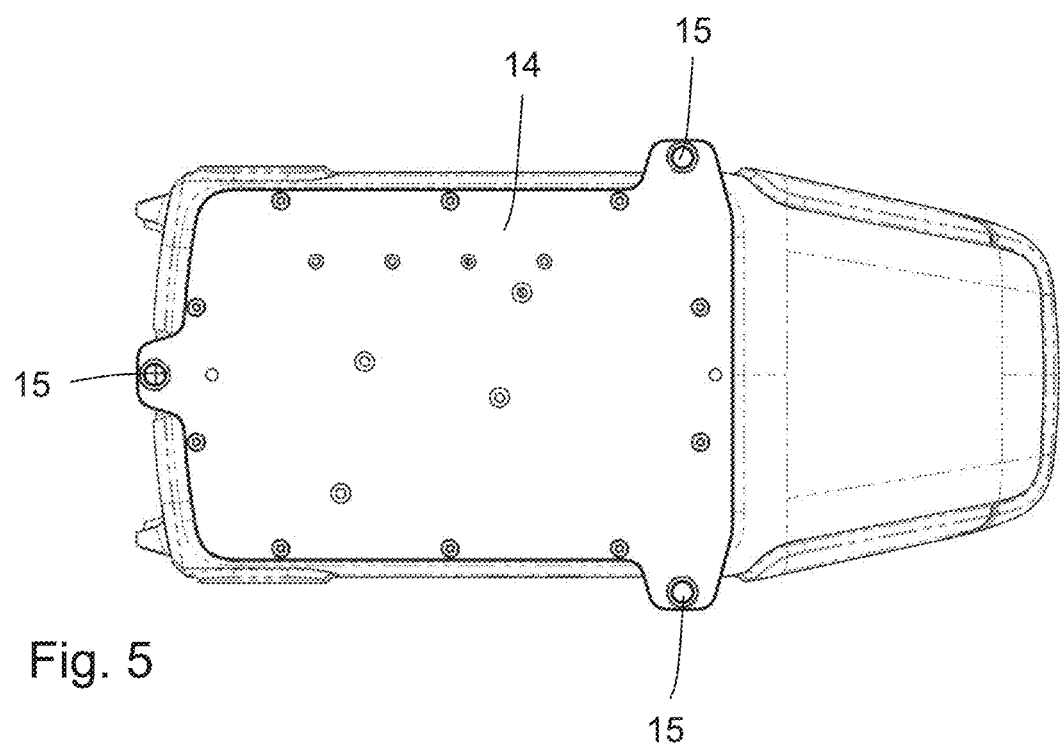
FIG. 5 shows an enlarged bottom view of the inertial measuring device of FIG. 3.

To enable seizing of the second handle area 11 designed slightly shorter, a recess 12 is formed on the housing (FIG. 4).

Opposite of the second handle area 11 and the recess 12, a plurality of support feet 13 (four support feet 13 in the example shown) are formed on the opposite front side of the housing 2. Thus, it is possible for an operator to seize the housing 2 at the second handle area 11 and put it on its support feet 13.

A horizontal fastening plate 14 extends on the underside of the housing 2. The fastening plate 14 is stably fastened on the housing 2 with high precision and is the mechanical connections means for the housing 2 and thus for the inertial measuring device 1. In the example shown, three fastening apertures 15 are provided on the fastening plate 14, which are each formed in fastening lugs 16, which extend from the actual fastening plate 14.

On the upper side of the carrying handle 3, two eyelets 17 serving as fastening means are provided. A carrying strap not shown can be threaded through the eyelets 17, thus enabling carrying the inertial measuring device 1 with the aid of the carrying strap.

The invention claimed is:

1. An inertial measuring device, comprising:
an inertial measuring unit for determining a north direction and for determining position angles;
a battery;
a wireless interface;
a housing, within which the inertial measuring unit, the battery and the interface are housed,
a horizontally extending fastening plate fastened on an underside of the housing to fasten the inertial measuring device on an object, the horizontally fastening plate covering a substantial portion of the underside of the housing; and
a carrying handle arranged on an upper side of the housing opposite of the fastening plate, the carrying handle configured as a one hand carrying handle for carrying the inertial measuring device with one hand during an intended use of the inertial measuring device, the carrying handle including a first handle area substantially parallel with the horizontally extending fastening plate, and a second handle area adjacent to the first handle area, the second handle area extending to the fastening plate at an angle of more than 30 degrees,
wherein the housing and the carrying handle each extend in a longitudinal direction, and
wherein at least a portion of the housing and a portion of the carrying handle are integrally formed.

2. The inertial measuring device according to claim 1, wherein the inertial measuring unit is a north-seeking means for determining the north direction and the position angles, comprising three gyroscopes and three acceleration sensors.

3. The inertial measuring device according to claim 1, wherein the battery is a rechargeable battery.

4. The inertial measuring device according to claim 1, wherein the battery is exchangeably inserted into the housing.

5. The inertial measuring device according to claim 1, wherein the interface is a Bluetooth interface.

6. The inertial measuring device according to claim 1, wherein the carrying handle includes a pair of eyelets for fastening a carrying strap, one of the pair of eyelets being formed at another end of the first handle area where the first handle area and the second handle area are joined.

7. A system comprising
the inertial measuring device according to claim 1;
a mobile data terminal; and
a computer program able to run on the mobile data terminal,
wherein data exchange between the inertial measuring device and the data terminal is possible via the interface.

8. The system according to claim 7, wherein the data terminal has a display means for displaying measurement results measured by the inertial measuring device and transmitted via the interface.

9. The system according to claim 7, wherein the data terminal has an input means for inputting control commands, for controlling the inertial measuring device.

10. The inertial measuring device according to claim 1, further comprising a recess formed between the housing and the second handle area to facilitate grasping and carrying the inertial measuring device by the second handle area.

11. The inertial measuring device according to claim 10, further comprising a plurality of support feet formed on a front side of the housing opposite that of the second handle area, the support feet configured to support the inertial measuring device when placed on the front side of the housing via the second handle area.

* * * * *